US010837365B2

(12) United States Patent
Kishida

(10) Patent No.: US 10,837,365 B2
(45) Date of Patent: Nov. 17, 2020

(54) COMBUSTOR PANEL, COMBUSTOR, COMBUSTION DEVICE, GAS TURBINE, AND METHOD OF COOLING COMBUSTOR PANEL

(71) Applicant: Mitsubishi Hitachi Power Systems, Ltd., Kanagawa (JP)

(72) Inventor: Hiroaki Kishida, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 140 days.

(21) Appl. No.: 16/076,422

(22) PCT Filed: Mar. 2, 2017

(86) PCT No.: PCT/JP2017/008293
§ 371 (c)(1),
(2) Date: Aug. 8, 2018

(87) PCT Pub. No.: WO2017/154729
PCT Pub. Date: Sep. 14, 2017

(65) Prior Publication Data
US 2019/0048799 A1 Feb. 14, 2019

(30) Foreign Application Priority Data
Mar. 10, 2016 (JP) .................................. 2016-047352

(51) Int. Cl.
*F23R 3/06* (2006.01)
*F02C 7/18* (2006.01)
(Continued)

(52) U.S. Cl.
CPC .............. *F02C 7/18* (2013.01); *F01D 9/023* (2013.01); *F23R 3/002* (2013.01); *F23R 3/06* (2013.01);
(Continued)

(58) Field of Classification Search
CPC .... F23R 3/002; F23R 3/02; F23R 3/06; F23R 2900/03041
See application file for complete search history.

(56) References Cited

U.S. PATENT DOCUMENTS 4,004,056 A * 1/1977 Carroll ................... F23M 5/085
428/593
5,775,108 A * 7/1998 Ansart ...................... F23R 3/06
60/752

(Continued)

FOREIGN PATENT DOCUMENTS

| JP | 60-143272 | 9/1985 |
| JP | 61-43675 | 3/1986 |

(Continued)

OTHER PUBLICATIONS

International Search Report dated May 16, 2017 in International (PCT) Application No. PCT/JP2017/008293, with English translation.

(Continued)

*Primary Examiner* — William H Rodriguez
(74) *Attorney, Agent, or Firm* — Wenderoth, Lind & Ponack, L.L.P.

(57) ABSTRACT

A combustor panel having a plurality of cooling flow paths formed between the outer surface and the inner surface of the combustor panel. The cooling flow paths have inlets that open at the outer surface and introduce a cooling medium into their interior, and outlets that open at the inner surface and discharge the cooling medium flowing through their interior. Among the plurality of cooling flow paths, each of plurality of cooling flow paths extending from a position along the edge of an aperture of the combustor panel forms an aperture-vicinity flow path. Among the plurality of aperture-vicinity flow paths, each of the aperture-vicinity flow paths for which the inlet is formed closer to the aperture than (Continued)

the outlet forms an aperture-side inlet flow path. The number of the aperture-side inlet flow paths is greater than one-half of the all of the aperture-vicinity flow paths.

17 Claims, 7 Drawing Sheets

(51) Int. Cl.
*F23R 3/42* (2006.01)
*F01D 9/02* (2006.01)
*F23R 3/00* (2006.01)

(52) U.S. Cl.
CPC ............ *F23R 3/42* (2013.01); *F05D 2240/35* (2013.01); *F23R 2900/03041* (2013.01); *F23R 2900/03044* (2013.01)

(56) References Cited

U.S. PATENT DOCUMENTS

| | | | | |
|---|---|---|---|---|
| 6,145,319 | A | 11/2000 | Burns et al. | |
| 7,216,485 | B2* | 5/2007 | Caldwell | F23R 3/06 29/889.721 |
| 7,614,235 | B2* | 11/2009 | Burd | F23R 3/002 60/752 |
| 7,631,502 | B2* | 12/2009 | Burd | F23R 3/06 60/752 |
| 7,748,222 | B2* | 7/2010 | Bernier | F23R 3/002 60/752 |
| 10,317,080 | B2* | 6/2019 | Tu, Jr. | F23R 3/002 |
| 10,378,768 | B2* | 8/2019 | Cunha | F23R 3/002 |
| 10,551,064 | B2* | 2/2020 | Rullaud | F23R 3/002 |
| 2003/0200752 | A1* | 10/2003 | Moertle | F23R 3/06 60/746 |
| 2003/0213250 | A1* | 11/2003 | Pacheco-Tougas | F23R 3/002 60/752 |
| 2009/0026713 | A1* | 1/2009 | Fujimoto | F01D 9/023 277/543 |
| 2010/0170260 | A1* | 7/2010 | Mawatari | F23R 3/005 60/755 |
| 2014/0144147 | A1* | 5/2014 | Kishida | F23R 3/06 60/754 |
| 2014/0216044 | A1* | 8/2014 | Erbas-Sen | F23R 3/002 60/772 |
| 2016/0047312 | A1 | 2/2016 | Hase et al. | |
| 2017/0219211 | A1* | 8/2017 | Kajimura | F02C 7/18 |

FOREIGN PATENT DOCUMENTS

| | | |
|---|---|---|
| JP | 61-135169 | 8/1986 |
| JP | 62-150543 | 9/1987 |
| JP | 2000-130758 | 5/2000 |
| JP | 2000-145479 | 5/2000 |
| JP | 2006-292362 | 10/2006 |
| JP | 2007-107541 | 4/2007 |
| JP | 2013-40574 | 2/2013 |
| JP | 6026028 | 11/2016 |

OTHER PUBLICATIONS

Written Opinion of the International Searching Authority dated May 16, 2017 in International (PCT) Application No. PCT/JP2017/008293, with English translation.

* cited by examiner

COMBUSTOR PANEL, COMBUSTOR, COMBUSTION DEVICE, GAS TURBINE, AND METHOD OF COOLING COMBUSTOR PANEL

TECHNICAL FIELD

The present invention relates to a combustor panel that defines a flow path through which a combustion gas flows, a combustor, a combustion device, a gas turbine, and a method of cooling the combustor panel.

This application claims priority based on JP 2016-047352 filed in Japan on Mar. 10, 2016, of which the contents are incorporated herein by reference.

BACKGROUND ART

A combustor of a gas turbine includes a transition piece (or combustion liner) that defines a flow path of a combustion gas, and a fuel injector that injects a fuel together with air into the transition piece. The fuel is burned in the transition piece, and a combustion gas produced by that burning of the fuel flows in the transition piece. Thus, the inner circumferential surface of the transition piece is exposed to a combustion gas having an extremely high temperature.

For example, in a transition piece disclosed in the following Patent Document 1, an aperture configured to supply air from the outer circumferential side into the combustion gas flow path on the inner circumferential side is formed.

CITATION LIST

Patent Document

Patent Document 1: JP 61-135169 UM-A

SUMMARY OF INVENTION

Problem to be Solved by the Invention

The fuel is burned in the transition piece, and a combustion gas produced by that burning of the fuel flows in the transition piece. Thus, a panel constituting the transition piece is exposed to the combustion gas having an extremely high temperature. Although the panel constituting the transition piece is exposed to the combustion gas having an extremely high temperature in this way, it is desired to enhance the durability of the panel.

Thus, an object of the present invention is to provide a combustor panel, a combustor, a combustion device, and a method of cooling the combustor panel that make it possible to enhance the durability of the combustor panel.

Solution to Problem

As a first aspect according to the invention for achieving the above-described object, a combustor panel is a combustor panel that defines the periphery of a combustion gas flow path through which a combustion gas flows from an upstream side to a downstream side in an axial direction in which an axis extends. The combustor panel includes: an inner surface facing the combustion gas; an outer surface facing an opposite side to a side that the inner surface faces; an aperture that passes through from the outer surface to the inner surface; and a plurality of cooling flow paths that extend between the inner surface and the outer surface in a direction along the inner surface, a cooling medium flowing in the interior thereof. Each of the plurality of cooling flow paths has an inlet that opens at the outer surface and introduces a cooling medium into the interior thereof, and an outlet that opens at the inner surface and discharges the cooling medium flowing through the interior thereof. Among the plurality of cooling flow paths, each of a plurality of cooling flow paths that extend from positions along the edge of the aperture in a direction along the inner surface forms an aperture-vicinity flow path. Among the plurality of aperture-vicinity flow paths, each of aperture-vicinity flow paths for which the inlet is formed on the side closer to the aperture than the outlet forms an aperture-side inlet flow path. The number of the aperture-side inlet flow paths is greater than one-half of all of the aperture-vicinity flow paths, or all of the aperture-vicinity flow paths are the aperture-side inlet flow paths.

In the vicinity of the aperture in the combustor panel, stress generated during the process of forming the aperture often remains. That is, residual stress often exists in the vicinity of the aperture. In addition, the outlets of the cooling flow paths are formed on the inner surface of the combustor panel. Thus, it is often the case where the residual stress also exists in the vicinity of the outlets on the inner surface of the combustor panel.

When the outlets of the aperture-vicinity flow paths are formed on the aperture side, the outlets of the aperture-vicinity flow paths are brought in close proximity to the edge of the aperture. Thus, higher stress remains in the vicinity of the aperture on the inner surface of the combustor panel that faces the combustion gas having a high temperature. When the shortest distances from the edge of the aperture to the aperture-vicinity flow paths are increased, a wide non-cooled area arises in the vicinity of the aperture, and high thermal stress occurs in the non-cooled area. In addition, since cooling air reaching the outlets of the aperture-vicinity flow paths is cooling air that has flowed through the aperture-vicinity flow paths, this cooling air has been heated while flowing through the aperture-vicinity flow paths and thus has low cooling performance. Thus, the cooling performance in the vicinity of the aperture becomes lower, and also in this context, high thermal stress occurs in the vicinity of the aperture.

For this reason, in the combustor panel, the number of the aperture-side inlet flow paths is greater than one-half of all of the aperture-vicinity flow paths, or all of the aperture-vicinity flow paths are the aperture-side inlet flow paths. The inlets of the aperture-vicinity flow paths are formed on the outer surface of the combustor panel. Thus, the residual stress in the vicinity of the aperture on the inner surface of the combustor panel that faces the combustion gas having a high temperature can be made smaller than that in the case where the outlets of the aperture-vicinity flow paths are formed on the aperture side. Therefore, the shortest distances from the edge of the aperture to the aperture-vicinity flow paths can be made smaller. In addition, cooling air that has flowed into the inlets of the aperture-vicinity flow paths is cooling air that has not flowed through the aperture-vicinity flow paths yet, and thus has high cooling performance. Thus, in the combustor panel, it is possible to increase the cooling performance in the vicinity of the air aperture and suppress the occurrence of the thermal stress in the vicinity of the aperture.

As a second aspect according to the invention for achieving the above-described object, a combustor panel is the combustor panel according to the first aspect, wherein: a part of the plurality of aperture-vicinity flow paths are the aperture-side inlet flow paths and the rest of the plurality of aperture-vicinity flow paths are non-aperture-side inlet flow paths for which the inlets are not formed on the side closer to the aperture than the outlets; and the non-aperture-side inlet flow paths are adjacent to the aperture-side inlet flow paths in a direction along the edge of the aperture but are not adjacent to other non-aperture-side inlet flow paths.

In the combustor panel, an area in the vicinity of the aperture having low cooling performance can be made significantly narrower.

As a third aspect according to the invention for achieving the above-described object, a combustor panel is any one of the above-described combustor panels, wherein: among the plurality of the aperture-vicinity flow paths, two aperture-vicinity flow paths adjacent to each other in the direction along the edge of the aperture are both the aperture-side inlet flow paths; and the two aperture-side inlet flow paths have mutually different flow path lengths.

In the case where the two aperture-side inlet flow paths adjacent to each other have the same flow path lengths, the position of the outlet of one aperture-side inlet flow path is substantially the same as the position of the outlet of the other aperture-side inlet flow path in an extension direction of the one aperture-side inlet flow path. That is, the outlets of the two aperture-side inlet flow paths are in proximity to each other. Cooling air reaching the outlets of the aperture-side inlet flow paths is cooling air that has flowed through the aperture-side inlet flow paths, and thus has low cooling performance. Thus, an area including respective ends of the two aperture-side inlet flow paths on the side farther from the aperture is an area having low cooling performance.

Accordingly, in the combustor panel, aperture-side inlet flow paths having shorter flow path lengths and aperture-side inlet flow paths having longer flow path lengths are adjacent to each other. As a result, the distance between the outlets of the two aperture-side inlet flow paths becomes larger, and thus the area having low cooling performance can be dispersed and made narrower.

As a fourth aspect according to the invention for achieving the above-described object, a combustor panel is the combustor panel according to the third aspect, wherein, on an extension line of a first aperture-side inlet flow path, having a shorter flow path length, of the two aperture-side inlet flow paths, a first adjacent flow path adjacent to the first aperture-side inlet flow path and serving as the cooling flow path is disposed. On an extension line of a second aperture-side inlet flow path, having a longer flow path length, of the two aperture-side inlet flow paths, a second adjacent flow path adjacent to the second aperture-side inlet flow path and serving as the cooling flow path is disposed. The first adjacent flow path has the outlet formed on the side closer to the aperture than the inlet, and the second adjacent flow path has the inlet formed on the side closer to the aperture than the outlet.

In the combustor panel, the inlets of the second adjacent flow paths disposed on the extension lines of the second aperture-side inlet flow paths having longer flow path lengths are formed on the side closer to the aperture. That is, in the combustor panel, the outlets of the second aperture-side flow paths and the inlets of the second adjacent flow paths are adjacent to each other in the extension directions of the second aperture-side inlet flow paths. Thus, even in the case where the outlets of the second aperture-side inlet flow paths are formed on the side farther from the aperture, it is possible to suppress decrease in cooling performance in an area including the outlets of the second aperture-side inlet flow paths with cooling air flowing in from the inlets of the second adjacent flow paths.

In addition, in the combustor panel, the outlets of the first adjacent flow paths disposed on the extension lines of the first aperture-side inlet flow paths having shorter flow path lengths are formed on the side closer to the aperture. Thus, it is impossible to compensate for cooling performance in an area including the outlets of the first aperture-side inlet flow paths with cooling air flowing through the first adjacent flow paths. However, since the flow path lengths of the first aperture-side inlet flow paths are shorter than those of the second aperture-side inlet flow paths, the cooling performance of the cooling air reaching the outlets of the first aperture-side inlet flow paths is hardly reduced. Thus, the cooling performance in the area including the outlets of the first aperture-side inlet flow paths is not that low.

Therefore, in the combustor panel, it is possible to realize the uniformization of cooling performance in an area including boundaries between the cooling flow paths except for the aperture-vicinity flow paths and the aperture-side inlet flow paths among the aperture-vicinity flow paths.

As a fifth aspect according to the invention for achieving the above-described object, a combustor panel is the combustor panel according to the third or fourth aspect, wherein the interval between the two aperture-side inlet flow paths in the direction along the edge of the aperture is the same interval at a plurality of positions in a flow path extension direction in which one flow path of the two aperture-side inlet flow paths extends.

In the combustor panel, it is possible to realize the uniformization of cooling performance at a plurality of positions between two aperture-side inlet flow paths in a flow path extension direction in which one flow path of the two aperture-side inlet flow paths extends.

As a sixth aspect according to the invention for achieving the above-described object, a combustor panel is any one of the above-described combustor panels, wherein, in the vicinity of the aperture, a curved section is formed at which the inner surface and the outer surface are gradually curved outwardly away from the combustion gas flow path in the radial direction with respect to the axis as the edge of the aperture approaches. In the aperture-side inlet flow paths among the plurality of the aperture-vicinity flow paths, the aperture-side ends thereof are formed in the curved section.

In the case where the curved section is formed in the vicinity of the aperture by press machining, compressive stress remains, as residual stress, in the vicinity of the aperture on the outer surface of the combustor panel due to the press machining. Thus, when the inlets of the aperture-side inlet flow paths are formed in the vicinity of the aperture on the outer surface of the combustor panel, the compressed stress acts on the edges of the inlets, thereby making it unlikely for cracks to be generated.

As a seventh aspect according to the invention for achieving the above-described object, a combustor panel is any one of the above-described combustor panels, wherein directions in which the plurality of aperture-vicinity flow paths extend are directions including a direction component of the axial direction.

In the combustor panel, it is possible to realize the uniformization of cooling performance at respective positions between two aperture-vicinity flow paths in the axial direction.

As an eighth aspect according to the invention for achieving the above-described object, a combustor includes:

any one of the above-described combustor panels; and a fuel injector that injects a fuel and air from the upstream side of the combustion gas flow path defined by the combustor panel into the combustion gas flow path.

As a ninth aspect according to the invention for achieving the above-described object, a combustion device includes:

the combustor according to the eighth aspect; an air supply pipe configured to supply air from the aperture into the combustion gas flow path; and a valve configured to adjust a flow rate of air flowing through the air supply pipe.

As a tenth aspect according to the invention for achieving the above-described object, a gas turbine includes:

the combustion device according to the ninth aspect, and a turbine that is driven by a combustion gas generated in the combustor.

As an eleventh aspect according to the invention for achieving the above-described object, a method of cooling a combustor panel is a method of cooling a combustor panel that defines the periphery of a combustion gas flow path through which a combustion gas flows. The combustor panel includes: an inner surface facing the combustion gas; an outer surface facing an outer side, which is an opposite side to a side that the inner surface faces; an aperture that passes through from the outer surface to the inner surface; and a plurality of cooling flow paths that extend between the inner surface and the outer surface in a direction along the inner surface, a cooling medium flowing in the interior thereof. Among the plurality of cooling flow paths, each of a plurality of cooling flow paths that extend from positions along the edge of the aperture in a direction along the inner surface forms an aperture-vicinity flow path. The number of the aperture-side inlet flow paths among the plurality of the aperture-vicinity flow paths is greater than one-half of all of the aperture-vicinity flow paths, or all of the aperture-vicinity flow paths are the aperture-side inlet flow paths. The cooling medium is supplied from the outer side and on the aperture side of the aperture-side inlet flow paths to the aperture-side inlet flow paths, and the cooling medium flowing through the aperture-side inlet flow paths is caused to flow out from the inner surface and at positions, in the aperture-side inlet flow paths, farther from the aperture than positions at which the cooling medium is supplied.

Advantageous Effect of Invention

According to an aspect of the present invention, it is possible to enhance the durability of a combustor panel.

DESCRIPTION OF EMBODIMENTS

The following describes in detail an embodiment of the present invention, with reference to the drawings.

Embodiment

Figure 1:
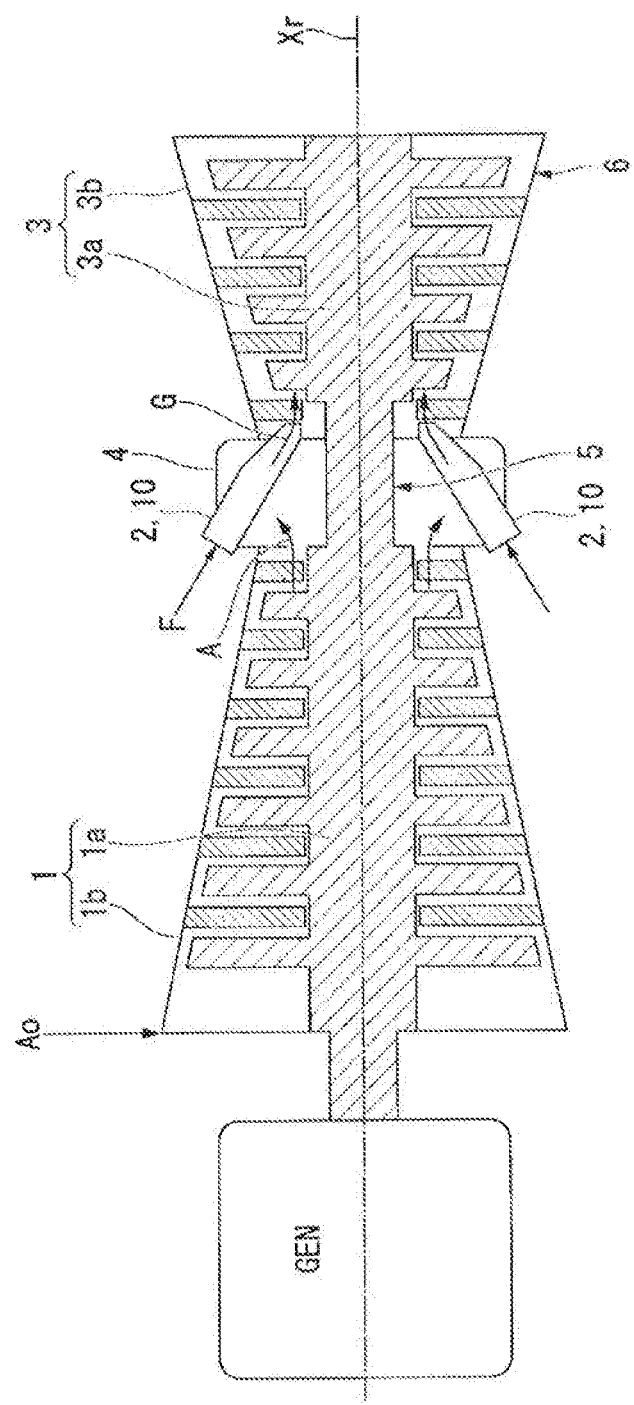
FIG. 1 is a schematic view illustrating the configuration of a gas turbine according to an embodiment of the present invention.

As illustrated in FIG. 1, a gas turbine according to the present embodiment includes a compressor 1 that generates compressed air A by compressing outside air Ao, a combustion device 2 that generates a combustion gas G by burning fuel F in the compressed air A, and a turbine 3 driven by the combustion gas G.

The compressor 1 includes a compressor rotor 1a that rotates around a rotational axis Xr and a compressor casing 1b that covers the compressor rotor 1a while allowing the compressor rotor 1a to rotate. The turbine 3 includes a turbine rotor 3a that rotates around a rotational axis Xr and a turbine casing 3b that covers the turbine rotor 3a while allowing the turbine rotor 3a to rotate. The rotational axis Xr of the compressor rotor 1a and the rotational axis Xr of the turbine rotor 3a are located on the same straight line. The compressor rotor 1a and the turbine rotor 3a are connected with each other to form a gas turbine rotor 5. A rotor of a power generator GEN, for example, is connected to the gas turbine rotor 5.

The gas turbine includes an intermediate casing 4 that covers the gas turbine rotor 5 while allowing the gas turbine rotor 5 to rotate. The compressor casing 1b, the intermediate casing 4, and the turbine casing 3b are arranged side-by-side in this order in a direction in which the rotational axis Xr extends. The compressor casing 1b, the intermediate casing 4, and the turbine casing 3b are connected with each other to form a gas turbine casing 6.

Figure 2:
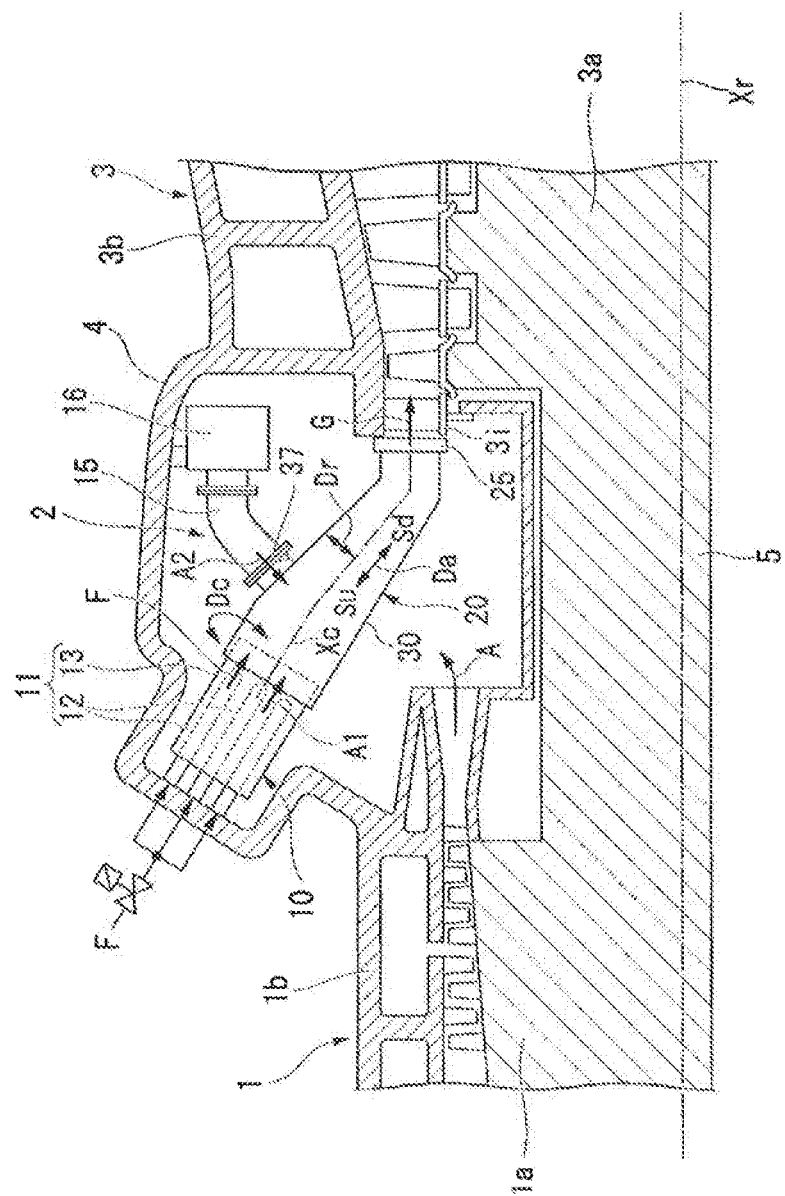
FIG. 2 is a cross-sectional view of the vicinity of a combustor in the gas turbine according to the embodiment of the present invention.

The combustion device 2 includes a plurality of combustors 10. As illustrated in FIG. 2, each of the combustors 10 includes a transition piece 20 in which the fuel F is burned internally, and a fuel injector 11 that feeds the fuel F and the compressed air A into the transition piece 20. The plurality of combustors 10 are arranged side-by-side in a circumferential direction with the rotational axis Xr serving as center, and are fixed to the intermediate casing 4. Each of the combustors 10 is disposed in the intermediate casing 4 in which the compressed air A compressed by the compressor 1 exists. The combustion device 2 further includes an air supply pipe 15 configured to supply the compressed air A into the transition piece 20 for each of the plurality of combustors, and a valve 16 configured to adjust a flow rate of air flowing through the air supply pipe 15. Both the air supply pipe 15 and the valve 16 are disposed in the intermediate casing 4. The compressed air A in the intermediate casing 4 can be supplied into the transition piece 20 via the valve 16 and the air supply pipe 15.

The fuel injector 11 includes a plurality of burners 12 that inject the fuel F and the compressed air A, and a burner holding cylinder 13 that holds the plurality of burners 12. All of the plurality of burners 12 are supported by the burner holding cylinder 13 so as to be parallel with a combustor axis Xc. In addition, all of the plurality of burners 12 inject the fuel F from one side to the other side of an axial direction Da in which the combustor axis Xc extends. In addition, all of the plurality of burners 12 inject the compressed air A from one side to the other side of the axial direction Da as primary air A1.

Figure 3:
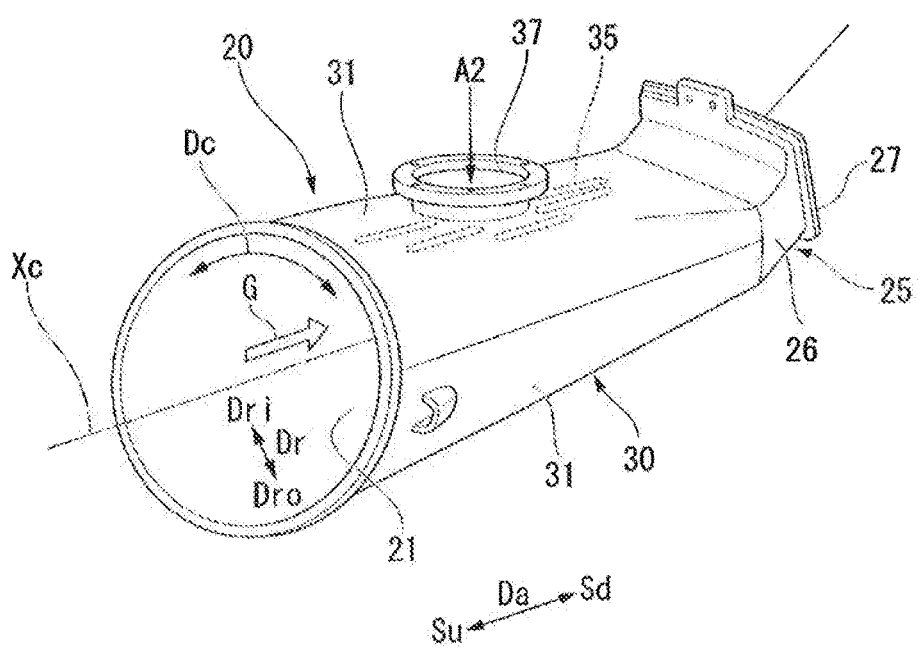
FIG. 3 is a perspective view illustrating a transition piece according to the embodiment of the present invention.

As illustrated in FIGS. 2 and 3, the transition piece 20 is formed in a tubular shape around the combustor axis Xc, and defines the periphery of a combustion gas flow path 21 through which the combustion gas G flows. Hereinafter, the one side of the axial direction Da will be referred to as an upstream side Su, and the other side of the axial direction Da will be referred to as a downstream side Sd. In addition, a circumferential direction with respect to the combustor axis Xc will simply be referred to as a circumferential direction Dc, and a radial direction with respect to a combustor axis Xc will simply be referred to as a radial direction Dr. In addition, in this radial direction, the side farther from the combustor axis Xc will be referred to as a radial-direction outer side Dro, and the opposite side of the radial-direction outer side Dro will be referred to as a radial-direction inner side Dri. There is also the case where the transition piece 20 and the burner holding cylinder 13 integrated with each other are called as a combustion liner.

As illustrated in FIG. 3, the transition piece 20 in the present embodiment includes a body section 30 having a tubular shape, and an outlet flange section 25 joined to the downstream side Sd of the body section 30.

The outlet flange section 25 includes a tube 26 formed in a tubular shape around the combustor axis Xc and defines a part of the combustion gas flow path 21, and a flange 27 formed at the downstream end of the tube 26. As illustrated in FIG. 2, the flange 27 is used to connect the transition piece 20 to a combustion gas inlet section 3i of the turbine 3. The tube 26 and the flange 27 are integrally molded by, for example, casting, etc. to form the outlet flange section 25. A thermal barrier coating (TBC) layer, which is not illustrated, is applied on the inner circumferential surface of the tube 26.

The body section 30 is formed in a tubular shape around the combustor axis Xc, and defines a part of the combustion gas flow path 21. The body section 30 is constituted of a plurality of curved combustor panels 31. The plurality of curved combustor panels 31 are arranged side-by-side in the circumferential direction Dc, and the ends of the combustor panels 31 are joined to each other in the circumferential direction Dc by welding so as to form a tubular shape. The body section 30 illustrated in FIG. 3 is formed by arranging two combustor panels 31 side-by-side in the circumferential direction Dc. However, the body section 30 may be formed by arranging, for example, three or more, for example, four combustor panels 31 side-by-side in the circumferential direction Dc. In addition, the body section 30 may be formed by curving a single combustor panel 31 in a tubular shape and joining the ends of the single combustor panel 31 by welding.

Figure 5:
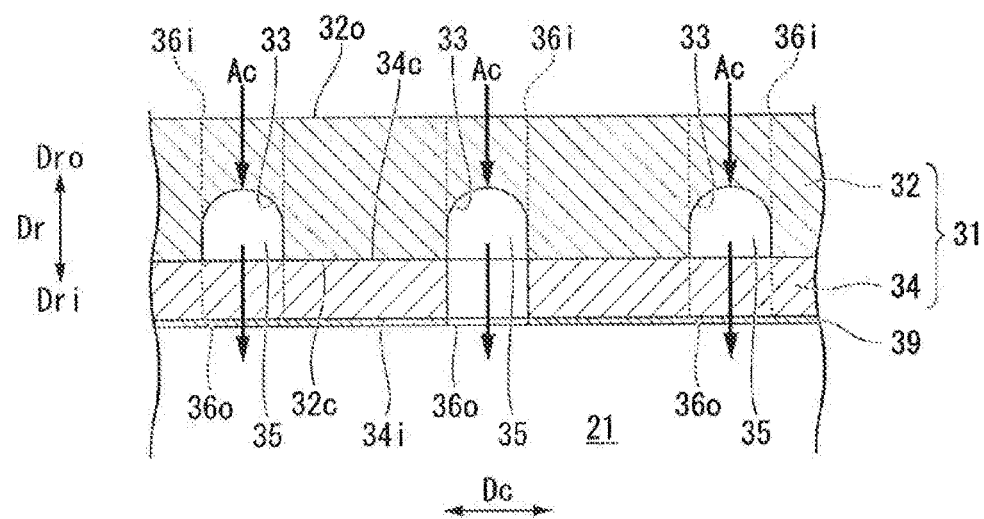
FIG. 5 is a cross-sectional view taken along a line V-V of FIG. 4.

As illustrated in FIG. 5, the combustor panel 31 includes an outside plate 32 and an inside plate 34. Among a pair of surfaces of the outside plate 32 facing mutually opposite directions, one surface forms an outer surface 32o and the other surface forms a joined surface 32c. In addition, among a pair of surfaces of the inside plate 34 facing mutually opposite directions, one surface forms a joined surface 34c, and the other surface forms an inner surface 34i. On the joined surface 32c of the outside plate 32, a plurality of long grooves 33 that are recessed toward the side of the outer surface 32o and that are long in a certain direction are formed. The outside plate 32 and the inside plate 34 form the combustor panel 31 by having the respective joined surfaces 32c, 34c joined to each other by brazing, etc. By joining the outside plate 32 and the inside plate 34, the apertures of the long grooves 33 formed in the outside plate 32 are blocked by the inside plate 34, and the long grooves 33 form cooling flow paths 35. Thus, the plurality of cooling flow paths 35 extend between the outer surface 32o and the inner surface 34i of the combustor panel 31 in a direction along the inner surface 34i.

Each of the plurality of cooling flow paths 35 includes an inlet 36i that opens at the outer surface 32o of the combustor panel 31 and that introduces the compressed air A into the inside, and an outlet 36o that opens at the inner surface 34i of the combustor panel 31 and that discharges the compressed air A flowing through the inside. That is, in the present embodiment, each of the cooling flow paths includes an independent single inlet and an independent single outlet. The inlet 36i is formed at the position of one end of two ends of the cooling flow path 35 in the extension direction of the cooling flow path 35. In addition, the outlet 36o is formed at the position of the other end of the two ends of the cooling flow path 35 in the extension direction of the cooling flow path 35.

Each of the plurality of combustor panels 31 is disposed such that the inner surface 34i of the inside plate 34 faces the inner circumferential side of the transition piece 20, the outer surface 32o of the outside plate 32 faces the outer circumferential side of the transition piece 20, and the direction in which the plurality of cooling flow paths 35 extend is the axial direction Da, and, as described above, the ends of the plurality of combustor panels 31 are joined to each other in the circumferential direction Dc. Thus, all of the plurality of cooling flow paths 35 of the body section 30 extend substantially in the axial direction Da, and the interval between two of the cooling flow paths 35 that are adjacent in the circumferential direction Dc is substantially the same at any position in the axial direction Da. The thermal barrier coating layer 39 is applied on the inner surface 34i of the combustor panel 31. Thus, the outer surface 32o of the outside plate 32 serves as the outer surface of the body section 30, and the surface of the thermal barrier coating layer 39 serves as the inner surface of the body section 30.

Figure 4:
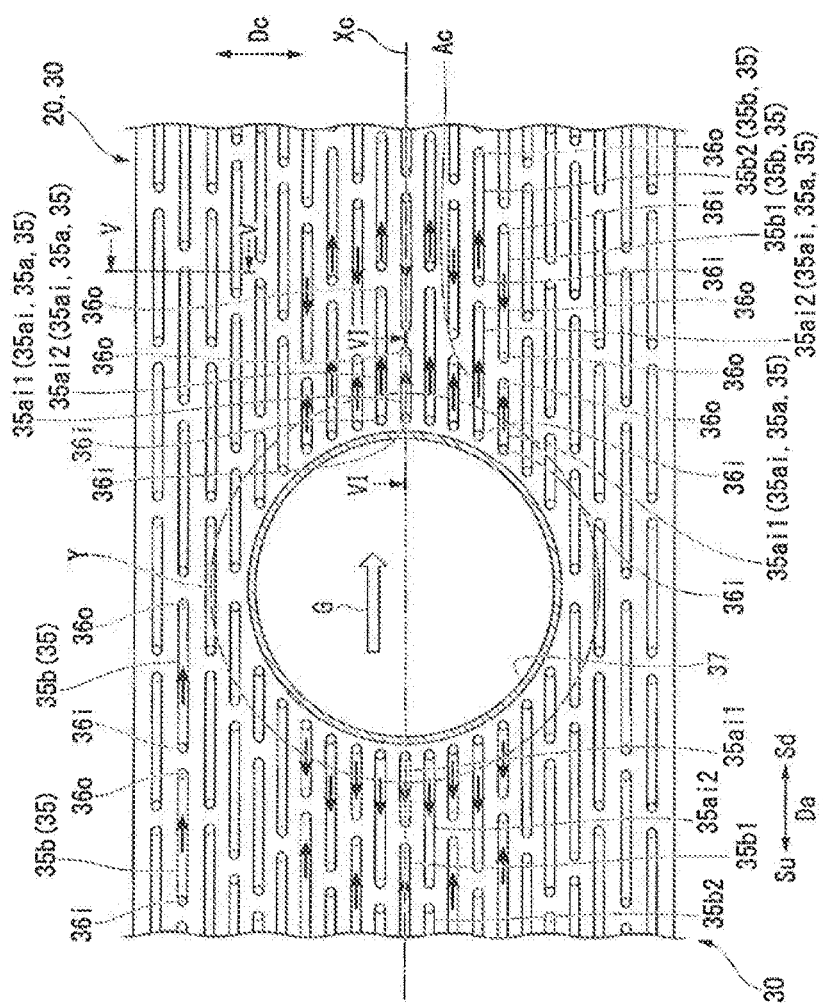
FIG. 4 is a plan view of a combustor panel according to the embodiment of the present invention.

As illustrated in FIGS. 2 to 4, a secondary air aperture 37 that passes through from the radial-direction outer side Dro to the radial-direction inner side Dri is formed in the body section 30. In other words, in one combustor panel 31 of the plurality of combustor panels 31, the secondary air aperture 37 that passes through from the outer surface 32o to the inner surface 34i of the one combustor panel 31 is formed. The aforementioned air supply pipe 15 is connected to the edge of the secondary air aperture 37. The connection between the air supply pipe 15 and the edge of the secondary air aperture 37 may be flange connection. From the secondary air aperture 37, the compressed air A in the intermediate casing 4 is supplied, as needed, into the body section 30 of the transition piece 20 as secondary air A2 via the valve 16 and the air supply pipe 15.

Figure 6:
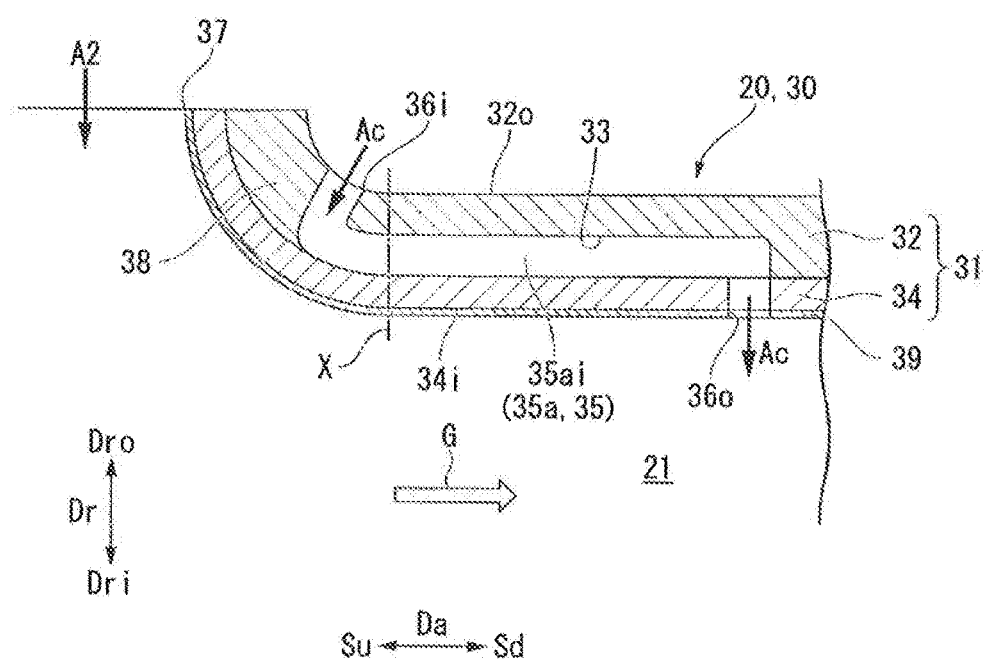
FIG. 6 is a cross-sectional view taken along a line VI-VI of FIG. 4.

As illustrated in FIG. 6, a curved section 38 is formed in the vicinity of the secondary air aperture 37 of the combustor panel 31. At the curved section 38, the inner surface 34i and the outer surface 32o of the combustor panel 31 are gradually curved toward the radial-direction outer side Dro as they get closer to the edge of the secondary air aperture 37. The curved section 38 is formed by, for example, plastic processing such as press molding.

As illustrated in FIG. 4, among the plurality of cooling flow paths 35, each of a plurality of cooling flow paths 35 that extend from positions along the edge of the secondary air aperture 37 in a direction along the inner surface 34i is an aperture-vicinity flow path 35a. Thus, in an area having the shortest distances from the aperture-side ends of the aperture-vicinity flow paths 35a to the edge of the secondary air aperture 37, other cooling flow paths 35 do not exist. In the present embodiment, for all of the aperture-vicinity flow paths 35a, inlets 36i are formed at the aperture-side ends thereof to form aperture-side inlet flow paths 35$ai$. Thus, for all of the aperture-vicinity flow paths 35$a$, outlets 36$o$ are formed at the ends on the side farther from the secondary air aperture 37.

The plurality of aperture-vicinity flow paths 35$a$ include first aperture-side inlet flow paths 35$ai$1 having a shorter flow path length and second aperture-side inlet flow paths 35$ai$2 having a longer flow path length. The first aperture-side inlet flow paths 35$ai$1 and the second aperture-side inlet flow paths 35$ai$2 are alternately disposed in a direction along the edge of the secondary air aperture 37. In other words, of two aperture-side inlet flow paths 35$ai$ that are adjacent to each other in the direction along the edge of the secondary air aperture 37, one aperture-side inlet flow path 35$ai$ forms a first aperture-side inlet flow path 35$ai$1, and the other aperture-side inlet flow path 35$ai$ forms a second aperture-side inlet flow path 35$ai$2.

Among the plurality of cooling flow paths 35, cooling flow paths 35 that are adjacent to the first aperture-side inlet flow paths 35$ai$1 on the extension lines of the first aperture-side inlet flow paths 35$ai$1 in the axial direction Da form first adjacent flow paths 35$b$1. In the first adjacent flow paths 35$b$1, the outlets 36$o$ are formed at the aperture-side ends, and the inlets 36$i$ are formed at the ends on the side farther from the secondary air aperture 37. Thus, the outlets 36$o$ of the first aperture-side inlet flow paths 35$ai$1 and the outlets 36$o$ of the first adjacent flow paths 35$b$1 are adjacent to each other in the axial direction Da. In addition, among the plurality of cooling flow paths 35, cooling flow paths 35 that are adjacent to the second aperture-side inlet flow paths 35$ai$2 on the extension lines of the second aperture-side inlet flow paths 35$ai$2 in the axial direction Da form second adjacent flow paths 35$b$2. In the second adjacent flow paths 35$b$2, the inlets 36$i$ are formed at the aperture-side ends thereof, and the outlets 36$o$ are formed at the ends thereof on the side farther from the secondary air aperture 37. Thus, the outlets 36$o$ of the second aperture-side inlet flow paths 35$ai$2 and the inlets 36$i$ of the second adjacent flow paths 35$b$2 are adjacent to each other in the axial direction Da.

Among the plurality of cooling flow paths 35$b$ except for the aperture-vicinity flow paths 35$a$, in two cooling flow paths 35$b$ that are adjacent in the axial direction Da, in the case where the inlet 36$i$ is formed at the aperture-side end of one cooling flow path 35$b$, the outlet 36$o$ is formed at the aperture-side end of the other cooling flow path 35$b$. That is, of the two cooling flow paths 35$b$ that are adjacent in the axial direction Da, the inlet 36$i$ of the one cooling flow path 35$b$ and the outlet 36$o$ of the other cooling flow path 35$b$ are adjacent to each other in the axial direction Da.

As illustrated in FIG. 6, the aperture-side ends of the plurality of aperture-vicinity flow paths 35$a$ are formed in the curved section 38 in the vicinity of the aperture. Thus, in the curved section 38, the inlets 36$i$ of the aperture-vicinity flow paths 35$a$, i.e., the inlets 36$i$ of the aperture-side inlet flow paths 35$ai$ are formed.

Actions and effects of the gas turbine according to the present embodiment described above will be described.

As illustrated in FIG. 1, the compressor 1 sucks the outside air Ao, and compresses the outside air Ao to generate the compressed air A. The compressed air A flows into the burner holding cylinder 13 of the combustor 10 as the primary air A1 via the intermediate casing 4. The primary air A1 that has flowed into the burner holding cylinder 13 is injected from the burner holding cylinder 13 into the transition piece 20. There is the case where the primary air A1 that has flowed into burner holding cylinder 13 flows into the burners 12 in the burner holding cylinder 13, and is injected from the burners 12 into the transition piece 20. The fuel F is supplied to each of the burners 12 of the combustor 10 from the outside. The fuel F that has flowed into the burners 12 is injected from the burners 12 into the transition piece 20. The fuel F injected into the transition piece 20 is burned in the primary air A1. As a result, the combustion gas G is generated in the transition piece 20.

There is the case where the compressed air A in the intermediate casing 4 is supplied from the secondary air aperture 37 of the body section 30 into the body section 30 of the transition piece 20 as the secondary air A2 via the valve 16 and the air supply pipe 15. The secondary air A2 is used, for example, to adjust a fuel/air ratio in the transition piece 20.

The high-temperature, high-pressure combustion gas G generated in the transition piece 20 flows toward the downstream side Sd in the transition piece 20, and flows into the turbine 3 from the combustion gas inlet section 3$i$ of the turbine 3. The turbine rotor 3$a$ is rotated by the combustion gas G. When the turbine rotor 3$a$ is rotated, for example, the rotor of the power generator GEN connected to the turbine rotor 3$a$ is rotated and the power generator GEN generates power.

The inner surface 34$i$ of the transition piece 20 is exposed to the combustion gas G having a high temperature. Thus, the thermal barrier coating layer 39 is applied on the inner surface 34$i$ of the transition piece 20. In addition, the compressed air A existing outside the transition piece 20 flows, as cooling air (cooling medium) Ac, into the cooling flow paths 35 in the combustor panel 31 constituting the transition piece 20, and the combustor panel 31 is cooled by the cooling air Ac.

The compressed air A flows, as the cooling air Ac, into the cooling flow paths 35 from the inlets 36$i$ that open at the outer surface 32$o$ of the combustor panel 31. The cooling air Ac exchanges heat with the combustor panel 31 while flowing through the cooling flow paths 35, and cools the combustor panel 31. The cooling air Ac flows out from the outlets 36$o$ that open at the inner surface 34$i$ of the combustor panel 31 to the combustion gas flow path 21. A part of the cooling air Ac that has flowed out to the combustion gas flow path 21 flows along the inner surface 34$i$ of the transition piece 20, and film-cools the inner surface 34$i$.

In the vicinity of the secondary air aperture 37 in the combustor panel 31, stress generated during the process of forming the secondary air aperture 37 often remains. That is, residual stress often exists in the vicinity of the secondary air aperture 37. In addition, the outlets 36$o$ of the cooling flow paths 35 are formed on the inner surface 34$i$ of the combustor panel 31. Thus, it is often the case where the residual stress also exists in the vicinity of the outlets 36$o$ on the inner surface 34$i$ of the combustor panel 31.

When the outlets 36$o$ are formed at the aperture-side ends of the aperture-vicinity flow paths 35$a$, the outlets 36$o$ of the aperture-vicinity flow paths 35$a$ are brought in close proximity to the edge of the secondary air aperture 37. Thus, higher stress remains in the vicinity of the secondary air aperture 37 on the inner surface 34$i$ of the combustor panel 31 that faces the combustion gas G having a high temperature. Then, when the shortest distances from the edge of the secondary air aperture 37 to the aperture-vicinity flow paths 35$a$ are increased, a wide non-cooled area arises in the vicinity of the secondary air aperture 37, and high thermal stress occurs in the non-cooled area. In addition, since the cooling air Ac reaching the outlets 36$o$ of the aperture-vicinity flow paths 35$a$ is the cooling air Ac that has flowed through the aperture-vicinity flow paths 35$a$, this cooling air Ac has been heated while flowing through the aperture-vicinity flow paths 35*a* and thus has low cooling performance. Therefore, the cooling performance in the vicinity of the secondary air aperture 37 becomes lower, and thus, also in this context, high thermal stress occurs in the vicinity of the secondary air aperture 37.

In addition, in the case where the aforementioned curved section 38 is formed in the vicinity of the secondary air aperture 37 by press machining, higher stress (residual stress) remains in the vicinity of the secondary air aperture 37. In particular, tensile stress due to the press machining remains, as residual stress, in the vicinity of the secondary air aperture 37 on the inner surface 34*i* of the combustor panel 31. When the outlets 36*o* of the aperture-vicinity flow paths 35*a* are formed in the vicinity of the secondary air aperture 37 on the inner surface 34*i* of the combustor panel 31, tensile stress acts on the edges of the outlets 36*o*, thereby easily causing cracks originating from the edges of the outlets 36*o* to be generated.

In the present embodiment, the inlets 36*i* are formed at the aperture-side ends of all of the aperture-vicinity flow paths 35*a*. The inlets 36*i* of the aperture-vicinity flow paths 35*a* are formed on the outer surface 32*o* of the combustor panel 31. Thus, the residual stress in the vicinity of the secondary air aperture 37 on the inner surface 34*i* of the combustor panel 31 that faces the combustion gas G having a high temperature can be made smaller than that in the case where the outlets 36*o* of the aperture-vicinity flow paths 35*a* are formed at the aperture-side ends thereof. Therefore, the shortest distances from the edge of the secondary air aperture 37 to the aperture-vicinity flow paths 35*a* can be made smaller and the non-cooled area in the vicinity of the secondary air aperture 37 can be made significantly smaller. In addition, the cooling air Ac that has flowed into the inlets 36*i* of the aperture-vicinity flow paths 35*a* is the cooling air Ac that has not flowed through the aperture-vicinity flow paths 35*a* yet, and thus has high cooling performance. Thus, it is possible to increase the cooling performance in the vicinity of the secondary air aperture 37 and suppress the occurrence of the thermal stress in the vicinity of the secondary air aperture 37.

In addition, in the case where the aforementioned curved section 38 is formed in the vicinity of the secondary air aperture 37 by press machining, compressive stress remains, as residual stress, in the vicinity of the secondary air aperture 37 on the outer surface 32*o* of the combustor panel 31 due to the press machining. When the inlets 36*i* of the aperture-vicinity flow paths 35*a* are formed in the vicinity of the secondary air aperture 37 on the outer surface 32*o* of the combustor panel 31, the compressed stress acts on the edges of the inlets 36*i*, thereby making it unlikely for cracks to be generated.

Therefore, according to the present embodiment, it is possible to enhance the durability in the vicinity of the secondary air aperture 37 in the combustor panel 31.

Here, the case where the inlets 36*i* are formed at the aperture-side ends of all of the aperture-vicinity flow paths 35*a* and where the flow path lengths of the plurality of aperture-vicinity flow paths 35*a* are made mutually the same will be described. In this case, positions of the outlets 36*o* of two of the aperture-vicinity flow paths 35*a* (aperture-side inlet flow paths 35*ai*) that are adjacent to each other in a direction along the edge of the secondary air aperture 37 are substantially the same positions in the axial direction Da. That is, the outlets 36*o* of the two aperture-vicinity flow paths 35*a* are in proximity to each other in the direction along the edge of the secondary air aperture 37. As described above, the cooling air Ac reaching the outlets 36*o* of the aperture-vicinity flow paths 35*a* is the cooling air Ac that has flowed through the aperture-vicinity flow paths 35*a*, and thus has low cooling performance. Therefore, an area including respective ends of the two aperture-vicinity flow paths 35*a* on the side farther from the secondary air aperture 37 is an area having low cooling performance.

In the present embodiment, the first aperture-side inlet flow paths 35*ai*1 having shorter flow path lengths and the second aperture-side inlet flow paths 35*ai*2 having longer flow path lengths are alternately disposed. As a result, the distance between the outlets 36*o* of two of the aperture-side inlet flow paths 35*ai* becomes larger, and thus the area having low cooling performance can be dispersed and made narrower.

In addition, in the present embodiment, the inlets 36*i* of the second adjacent flow paths 35*b*2 disposed on the extension lines of the second aperture-side inlet flow paths 35*ai*2 having longer flow path lengths are formed at the aperture-side ends of the second adjacent flow paths 35*b*2. That is, in the present embodiment, the outlets 36*o* of the second aperture-side inlet flow paths 35*ai*2 and the inlets 36*i* of the second adjacent flow paths 35*b*2 are adjacent to each other in the axial direction Da. Thus, even in the case where the outlets 36*o* of the second aperture-side inlet flow paths 35*ai*2 are formed at the ends on the side farther from the secondary air aperture 37, it is possible to suppress decrease in cooling performance in an area including the outlets 36*o* of the second aperture-side inlet flow paths 35*ai*2 with the cooling air Ac flowing in from the inlets 36*i* of the second adjacent flow paths 35*b*2.

In addition, in the present embodiment, the outlets 36*o* of the first adjacent flow paths 35*b*1 disposed on the extension lines of the first aperture-side inlet flow paths 35*ai*1 having shorter flow path lengths are formed at the aperture-side ends of the first adjacent flow paths 35*b*1. Thus, it is impossible to compensate for cooling performance in an area including the outlets 36*o* of the first aperture-side inlet flow paths 35*ai*1 with the cooling air Ac flowing through the first adjacent flow paths 35*b*1. However, since the flow path lengths of the first aperture-side inlet flow paths 35*ai*1 are shorter than those of the second aperture-side inlet flow paths 35*ai*2, the cooling performance of the cooling air Ac reaching the outlets 36*o* of the first aperture-side inlet flow paths 35*ai*1 is hardly reduced. Thus, the cooling performance in a flow area including the outlets 36*o* of the first aperture-side inlet flow paths 35*ai*1 is not that low.

Therefore, in the present embodiment, it is possible to realize the uniformization of cooling performance in an area including boundaries between the cooling flow paths 35*b* except for the aperture-vicinity flow paths 35*a* and the aperture-vicinity flow paths 35*a*.

In addition, in the present embodiment, of the two cooling flow paths 35*b* that are adjacent in the axial direction Da, the inlet 36*i* of one cooling flow path 35*b* and the outlet 36*o* of the other cooling flow path 35*b* are adjacent to each other in the axial direction Da. Thus, it is possible to compensate for cooling performance in an area including the outlet 36*o* of the other cooling flow path 35*b* with the cooling air Ac flowing through the one cooling flow path 35*b*. Therefore, it is possible to realize the uniformization of cooling performance in an area in which the plurality of cooling flow paths 35*b* except for the aperture-vicinity flow paths 35*a* are disposed.

As described above, in the present embodiment, it is possible to realize the uniformization of cooling performance in an area including boundaries between the cooling flow paths 35b except for the aperture-vicinity flow paths 35a and the aperture-vicinity flow paths 35a, and in an area in which the cooling flow paths 35b except for the aperture-vicinity flow paths 35a are disposed. Thus, in the present embodiment, it is possible to suppress the occurrence of thermal stress in these areas. Therefore, in the present embodiment, it is also possible to enhance the durability in these areas.

Various Modifications

The secondary air aperture 37 in the present embodiment is an aperture that introduces the secondary air A2 from the side of the outer surface 32o to the side of the inner surface 34i of the combustor panel 31. However, this aperture may be an aperture that passes through from the outer surface 32o of the combustor panel 31 to the inner surface 34i of one combustor panel 31, and may not be an aperture that introduces the secondary air A2 to the side of the inner surface 34i.

Figure 7:
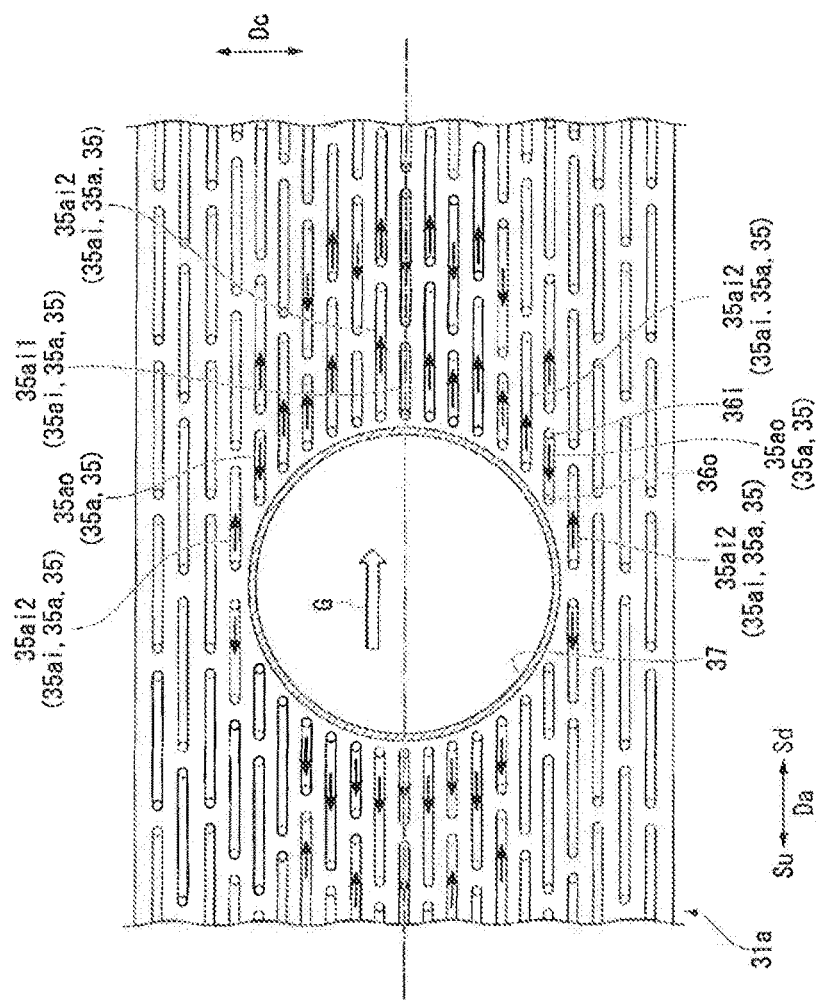
FIG. 7 is a plan view of a combustor panel according to a modification of the embodiment of the present invention.

All of the aperture-vicinity flow paths 35a in the present embodiment are the aperture-side inlet flow paths 35ai in which the inlets 36i are formed at the aperture-side ends thereof. However, as illustrated in FIG. 7, among the plurality of aperture-vicinity flow paths 35a formed in the combustor panel 31a, a part of the aperture-vicinity flow paths 35a may be the aperture-side inlet flow paths 35ai in which the inlets 36i are formed at the aperture-side ends thereof, and the rest of the aperture-vicinity flow paths 35a may be non-aperture-side inlet flow paths 35ao in which the inlets 36i are not formed at the aperture-side ends thereof. However, in this case, the number of the aperture-side inlet flow paths 35ai should be greater than one-half of the all of the aperture-vicinity flow paths 35a. In other words, the number of the aperture-side inlet flow paths 35ai should be greater than the number of the non-aperture-side inlet flow paths 35ao. In addition, in this case, it is desirable that the non-aperture-side inlet flow paths 35ao are adjacent to the aperture-side inlet flow paths 35ai, but are not adjacent to the other non-aperture-side inlet flow paths 35ao.

In the present embodiment, in all of the cooling flow paths 35 including the aperture-vicinity flow paths 35a, with respect to two ends of each cooling flow path 35 in the extension direction thereof, the inlet 36i is formed at the position of one end, and the outlet 36o is formed at the position of the other end. However, the inlet 36i and the outlet 36o may not be formed at the positions of the ends of the cooling flow path 35 in the extension direction thereof.

In the above-described embodiment, among the plurality of cooling flow paths 35, a plurality of cooling flow paths 35 that extend from positions along the edge of the secondary air aperture 37 in a direction along the inner surface 34i are the aperture-vicinity flow paths 35a, and in an area having the shortest distances from the aperture-side ends of the aperture-vicinity flow paths 35a to the edge of the secondary air aperture 37, other cooling flow paths 35 do not exist. However, as illustrated in FIG. 6, in the combustor panel 31, cooling flow paths 35 for which at least a part thereof exists in an area from a part X where the curved section 38 starts to the aperture 37 may be the aperture-vicinity flow paths 35a. In addition, as illustrated in FIG. 7, cooling flow paths 35 for which at least a part thereof exists in an area within a certain distance Y from the aperture 37 may be the aperture-vicinity flow paths 35a. In this case, the distance Y defining this area is a distance within which, among all of the cooling flow paths 35 partly existing in the area, the number of the aperture-side inlet flow paths 35ai is one-half or more, or all of these cooling flow paths 35 are the aperture-side inlet flow paths 35ai.

In the present embodiment, all of the cooling flow paths 35 including the aperture-vicinity flow paths 35a extend in a straight line in the surface along the inner surface 34i of the combustor panel 31. However, the cooling flow paths 35 may have curved sections in the surface along the inner surface 34i of the combustor panel 31.

All of the cooling flow paths 35 in the present embodiment have substantially the same cross-sectional area at any position in the extension direction of the flow paths. However, for some of the cooling flow paths 35, the cross-sectional areas thereof may be changed in accordance with the change in position in the extension direction of the flow paths. For example, the cross-sectional areas of the flow paths may be increased in an area that is easily heated.

In the above-described embodiment, the combustor panel 31 is configured by joining two plates, namely, the outside plate 32 and the inside plate 34. However, the combustor panel 31 may be configured with a single plate.

INDUSTRIAL APPLICABILITY

According to an aspect of the present invention, it is possible to enhance the durability of a combustor panel.

REFERENCE SIGNS LIST

1 Compressor
1a Compressor rotor
1b Compressor casing
2 Combustion device
3 Turbine
3a Turbine rotor
3b Turbine casing
3i Combustion gas inlet section
4 Intermediate casing
5 Gas turbine rotor
6 Gas turbine casing
10 Combustor
11 Fuel injector
12 Burner
13 Burner holding cylinder
15 Air supply pipe
16 Valve
20 Transition piece
21 Combustion gas flow path
25 Outlet flange section
30 Body section
31, 31a Combustor panel
32 Outside plate
32o Outer surface
34 Inside plate
34i Inner surface
35, 35b Cooling flow path
35a Aperture-vicinity flow path
35ai Aperture-side inlet flow path
35ai1 First aperture-side inlet flow path
35ai2 Second aperture-side inlet flow path
35ao Non-aperture-side inlet flow path
35b1 First adjacent flow path
35b2 Second adjacent flow path
36i Inlet
36o Outlet
37 Secondary air aperture (or simply, aperture)
38 Curved section
39 Thermal barrier coating layer
A Compressed air
A1 Primary air A2 Secondary air
Ac Cooling air (cooling medium)
F Fuel
G Combustion gas
Xr Rotational axis
Xc Combustor axis
Da Axial direction
Su Upstream side
Sd Downstream side
Dc Circumferential direction
Dr Radial direction
Dri Radial-direction inner side
Dro Radial-direction outer side

The invention claimed is:

1. A combustor panel that defines the periphery of a combustion gas flow path through which a combustion gas flows from an upstream side to a downstream side in an axial direction in which an axis extends, the combustor panel comprising:
an inner surface facing the combustion gas;
an outer surface facing an opposite side to a side that the inner surface faces;
an aperture that passes through from the outer surface to the inner surface; and
a plurality of cooling flow paths that extend between the inner surface and the outer surface in a direction along the inner surface, a cooling medium flowing in the interior thereof;
wherein:
each of the plurality of cooling flow paths includes an inlet that opens at the outer surface and introduces a cooling medium into the interior thereof, and an outlet that opens at the inner surface and discharges the cooling medium flowing through the interior thereof;
among the plurality of cooling flow paths, each of a plurality of cooling flow paths that extend from positions along an edge of the aperture in a direction along the inner surface forms an aperture-vicinity flow path;
among the plurality of aperture-vicinity flow paths, each of aperture-vicinity flow paths for which the inlet is formed on the side closer to the aperture than the outlet forms an aperture-side inlet flow path;
the number of the aperture-side inlet flow paths is greater than one-half of all of the aperture-vicinity flow paths, or all of the aperture-vicinity flow paths are the aperture-side inlet flow paths;
a part of the plurality of aperture-vicinity flow paths are the aperture-side inlet flow paths and the rest of the plurality of aperture-vicinity flow paths are non-aperture-side inlet flow paths for which the inlets are not formed on the side closer to the aperture than the outlets; and
the non-aperture-side inlet flow paths are adjacent to the aperture-side inlet flow paths in a direction along the edge of the aperture but are not adjacent to the other non-aperture-side inlet flow paths.

2. The combustor panel according to claim 1, wherein directions in which the plurality of aperture-vicinity flow paths extend are directions including a direction component of the axial direction.

3. A combustor comprising:
the combustor panel according to claim 1; and
a fuel injector that injects a fuel and air from the upstream side of the combustion gas flow path defined by the combustor panel into the combustion gas flow path.

4. A combustion device comprising:
the combustor according to claim 3;
an air supply pipe configured to supply air from the aperture into the combustion gas flow path; and
a valve configured to adjust a flow rate of air flowing through the air supply pipe.

5. A gas turbine comprising:
the combustion device according to claim 4; and
a turbine that is driven by a combustion gas generated in the combustor.

6. A combustor panel that defines the periphery of a combustion gas flow path through which a combustion gas flows from an upstream side to a downstream side in an axial direction in which an axis extends, the combustor panel comprising:
an inner surface facing the combustion gas;
an outer surface facing an opposite side to a side that the inner surface faces;
an aperture that passes through from the outer surface to the inner surface; and
a plurality of cooling flow paths that extend between the inner surface and the outer surface in a direction along the inner surface, a cooling medium flowing in the interior thereof;
wherein:
each of the plurality of cooling flow paths includes an inlet that opens at the outer surface and introduces a cooling medium into the interior thereof, and an outlet that opens at the inner surface and discharges the cooling medium flowing through the interior thereof;
among the plurality of cooling flow paths, each of a plurality of cooling flow paths that extend from positions along an edge of the aperture in a direction along the inner surface forms an aperture-vicinity flow path;
among the plurality of aperture-vicinity flow paths, each of aperture-vicinity flow paths for which the inlet is formed on the side closer to the aperture than the outlet forms an aperture-side inlet flow path;
the number of the aperture-side inlet flow paths is greater than one-half of all of the aperture-vicinity flow paths, or all of the aperture-vicinity flow paths are the aperture-side inlet flow paths;
among the plurality of the aperture-vicinity flow paths, two aperture-vicinity flow paths adjacent to each other in the direction along the edge of the aperture are both the aperture-side inlet flow paths; and
the two aperture-side inlet flow paths have mutually different flow path lengths.

7. The combustor panel according to claim 6, wherein:
on an extension line of a first aperture-side inlet flow path, having a shorter flow path length, of the two aperture-side inlet flow paths, a first adjacent flow path adjacent to the first aperture-side inlet flow path and serving as the cooling flow path is disposed;
on an extension line of a second aperture-side inlet flow path, having a longer flow path length, of the two aperture-side inlet flow paths, a second adjacent flow path adjacent to the second aperture-side inlet flow path and serving as the cooling flow path is disposed;
the first adjacent flow path has the outlet formed on the side closer to the aperture than the inlet; and
the second adjacent flow path has the inlet formed on the side closer to the aperture than the outlet.

8. The combustor panel according to claim 6, wherein the interval between the two aperture-side inlet flow paths in the direction along the edge of the aperture is the same interval at a plurality of positions in a flow path extension direction in which one flow path of the two aperture-side inlet flow paths extends.

9. The combustor panel according to claim 6, wherein directions in which the plurality of aperture-vicinity flow paths extend are directions including a direction component of the axial direction.

10. A combustor comprising:
the combustor panel according to claim 6; and
a fuel injector that injects a fuel and air from the upstream side of the combustion gas flow path defined by the combustor panel into the combustion gas flow path.

11. A combustion device comprising:
the combustor according to claim 10;
an air supply pipe configured to supply air from the aperture into the combustion gas flow path; and
a valve configured to adjust a flow rate of air flowing through the air supply pipe.

12. A gas turbine comprising:
the combustion device according to claim 11; and
a turbine that is driven by a combustion gas generated in the combustor.

13. A combustor panel that defines the periphery of a combustion gas flow path through which a combustion gas flows from an upstream side to a downstream side in an axial direction in which an axis extends, the combustor panel comprising:
an inner surface facing the combustion gas;
an outer surface facing an opposite side to a side that the inner surface faces;
an aperture that passes through from the outer surface to the inner surface; and
a plurality of cooling flow paths that extend between the inner surface and the outer surface in a direction along the inner surface, a cooling medium flowing in the interior thereof;
wherein:
each of the plurality of cooling flow paths includes an inlet that opens at the outer surface and introduces a cooling medium into the interior thereof, and an outlet that opens at the inner surface and discharges the cooling medium flowing through the interior thereof;
among the plurality of cooling flow paths, each of a plurality of cooling flow paths that extend from positions along an edge of the aperture in a direction along the inner surface forms an aperture-vicinity flow path;
among the plurality of aperture-vicinity flow paths, each of aperture-vicinity flow paths for which the inlet is formed on the side closer to the aperture than the outlet forms an aperture-side inlet flow path;
the number of the aperture-side inlet flow paths is greater than one-half of all of the aperture-vicinity flow paths, or all of the aperture-vicinity flow paths are the aperture-side inlet flow paths;
in the vicinity of the aperture, a curved section is formed at which the inner surface and the outer surface are gradually curved outwardly away from the combustion gas flow path in the radial direction with respect to the axis as the edge of the aperture approaches; and
in the aperture-side inlet flow paths among the plurality of aperture-vicinity flow paths, the aperture-side ends thereof are formed in the curved section.

14. The combustor panel according to claim 13, wherein directions in which the plurality of aperture-vicinity flow paths extend are directions including a direction component of the axial direction.

15. A combustor comprising:
the combustor panel according to claim 13; and
a fuel injector that injects a fuel and air from the upstream side of the combustion gas flow path defined by the combustor panel into the combustion gas flow path.

16. A combustion device comprising:
the combustor according to claim 15;
an air supply pipe configured to supply air from the aperture into the combustion gas flow path; and
a valve configured to adjust a flow rate of air flowing through the air supply pipe.

17. A gas turbine comprising:
the combustion device according to claim 16; and
a turbine that is driven by a combustion gas generated in the combustor.

* * * * *